United States Patent
Chang

(10) Patent No.: US 9,514,080 B1
(45) Date of Patent: *Dec. 6, 2016

(54) METHOD AND APPARATUS FOR PROVIDING AN INTERFACE BETWEEN A HOST DEVICE AND A PLURALITY OF STORAGE DEVICES

(71) Applicant: Marvell International Ltd., Hamilton (BM)

(72) Inventor: Po-Chien Chang, Saratoga, CA (US)

(73) Assignee: Marvell International Ltd., Hamilton (BM)

( * ) Notice: Subject to any disclaimer, the term of this patent is extended or adjusted under 35 U.S.C. 154(b) by 281 days.

This patent is subject to a terminal disclaimer.

(21) Appl. No.: 14/215,919

(22) Filed: Mar. 17, 2014

Related U.S. Application Data

(63) Continuation of application No. 11/879,108, filed on Jul. 16, 2007, now Pat. No. 8,677,047, which is a continuation of application No. 10/339,897, filed on Jan. 10, 2003, now Pat. No. 7,246,192.

(51) Int. Cl.
  *G06F 13/36* (2006.01)
  *G06F 13/38* (2006.01)

(52) U.S. Cl.
  CPC ............ *G06F 13/387* (2013.01); *G06F 13/36* (2013.01)

(58) Field of Classification Search
  CPC .................................................. G06F 13/36
  USPC ................................ 710/62, 71, 74, 302, 311
  See application file for complete search history.

(56) References Cited

U.S. PATENT DOCUMENTS

| | | |
|---|---|---|
| 4,456,965 A | 6/1984 | Graber et al. |
| 4,747,047 A | 5/1988 | Coogan et al. |
| 5,210,855 A | 5/1993 | Bartol |
| 5,220,275 A | 6/1993 | Holmqvist |
| 5,222,062 A | 6/1993 | Sharma et al. |
| 5,274,665 A | 12/1993 | Schilling |
| 5,331,646 A | 7/1994 | Krueger et al. |
| 5,446,767 A | 8/1995 | Nakagawa et al. |
| 5,471,152 A | 11/1995 | Gheewala et al. |
| 5,471,585 A | 11/1995 | Barakat et al. |
| 5,530,960 A | 6/1996 | Parks et al. |

(Continued)

FOREIGN PATENT DOCUMENTS

| | | |
|---|---|---|
| EP | 0876016 | 11/1998 |
| GB | 2408624 A | 6/2005 |

OTHER PUBLICATIONS

Sonnet Inc., "Tempo Bridge", Sonnet Inc.

(Continued)

*Primary Examiner* — Khanh Dang

(57) ABSTRACT

An emulation circuit configured to emulate each of a master mode and a slave mode to provide an interface between a host device and a plurality of storage devices. The emulation circuit includes a first bus and a second bus. The emulation circuit includes a plurality of bridge circuits each configured to communicate with the host device over the first bus, communicate with a respective storage device of a plurality of storage devices over the second bus, and receive a mode select signal configured to set the bridge circuit to one of a host mode and a device mode. The bridge circuit is further configured to, if the mode select signal sets the bridge circuit to the host mode, select, based on an emulation select signal, between the master mode and the slave mode.

16 Claims, 3 Drawing Sheets

(56) References Cited

U.S. PATENT DOCUMENTS

| | | | |
|---|---|---|---|
| 5,542,110 A | 7/1996 | Minagawa | |
| 5,553,230 A | 9/1996 | Petersen et al. | |
| 5,564,114 A | 10/1996 | Popat et al. | |
| 5,661,765 A | 8/1997 | Ishizu | |
| 5,748,645 A | 5/1998 | Hunter et al. | |
| 5,783,960 A | 7/1998 | Lackey | |
| 5,787,112 A | 7/1998 | Murai | |
| 5,787,485 A | 7/1998 | Fitzgerald, V et al. | |
| 5,802,318 A | 9/1998 | Murray et al. | |
| 5,812,754 A | 9/1998 | Lui et al. | |
| 5,826,048 A | 10/1998 | Dempsey et al. | |
| 5,828,854 A | 10/1998 | Wade | |
| 5,848,278 A | 12/1998 | Sakai | |
| 5,854,941 A | 12/1998 | Ballard et al. | |
| 5,886,901 A | 3/1999 | Magoshi | |
| 5,894,560 A | 4/1999 | Carmichael et al. | |
| 5,909,451 A | 6/1999 | Lach et al. | |
| 6,009,275 A | 12/1999 | DeKoning et al. | |
| 6,021,462 A | 2/2000 | Minow et al. | |
| 6,038,267 A | 3/2000 | Oura et al. | |
| 6,057,863 A | 5/2000 | Olarig | |
| 6,059,836 A | 5/2000 | Liguori | |
| 6,073,188 A | 6/2000 | Fleming | |
| 6,092,169 A | 7/2000 | Murthy et al. | |
| 6,106,568 A | 8/2000 | Beausang et al. | |
| 6,124,727 A | 9/2000 | Bridgewater, Jr. et al. | |
| 6,148,366 A | 11/2000 | Watanabe | |
| 6,178,215 B1 | 1/2001 | Zhang et al. | |
| 6,223,238 B1 | 4/2001 | Meyer et al. | |
| 6,237,052 B1 | 5/2001 | Stolowitz | |
| 6,314,145 B1 | 11/2001 | van Driest | |
| 6,330,687 B1 | 12/2001 | Griffith | |
| 6,363,439 B1 | 3/2002 | Battles et al. | |
| 6,367,033 B1 | 4/2002 | Jibbe | |
| 6,378,039 B1 | 4/2002 | Obara et al. | |
| 6,388,590 B1 | 5/2002 | Ng | |
| 6,388,591 B1 | 5/2002 | Ng | |
| 6,442,722 B1 | 8/2002 | Nadeau-Dostie et al. | |
| 6,447,340 B1 | 9/2002 | Wu | |
| 6,447,655 B2 | 9/2002 | Lantsman | |
| 6,480,930 B1 | 11/2002 | Zakai et al. | |
| 6,484,294 B1 | 11/2002 | Kiyoshige et al. | |
| 6,496,900 B1 | 12/2002 | McDonald et al. | |
| 6,505,250 B2 | 1/2003 | Freund et al. | |
| 6,549,981 B2 | 4/2003 | McDonald et al. | |
| 6,557,065 B1 | 4/2003 | Peleg et al. | |
| 6,564,271 B2 | 5/2003 | Micalizzi, Jr. et al. | |
| 6,578,126 B1 | 6/2003 | MacLellan et al. | |
| 6,614,842 B1 | 9/2003 | Chou et al. | |
| 6,639,885 B1 | 10/2003 | Yada et al. | |
| 6,662,076 B1 | 12/2003 | Conboy et al. | |
| 6,678,768 B1 | 1/2004 | Craft | |
| 6,687,775 B1 | 2/2004 | Bassett | |
| 6,697,867 B1 | 2/2004 | Chong, Jr. | |
| 6,697,885 B1 | 2/2004 | Goodfellow | |
| 6,704,300 B1 | 3/2004 | Chen et al. | |
| 6,731,688 B1 | 5/2004 | Johnson | |
| 6,735,650 B1 | 5/2004 | Rothberg | |
| 6,791,779 B1 | 9/2004 | Singh et al. | |
| 6,792,494 B2 | 9/2004 | Bennett et al. | |
| 6,813,688 B2 | 11/2004 | Wu et al. | |
| 6,819,187 B1 | 11/2004 | Ming et al. | |
| 6,845,420 B2 | 1/2005 | Resnick | |
| 6,854,045 B2 | 2/2005 | Ooi et al. | |
| 6,895,455 B1 | 5/2005 | Rothberg | |
| 6,898,655 B1 | 5/2005 | Sutardja | |
| 6,904,553 B1 | 6/2005 | Brown | |
| 6,908,330 B2 | 6/2005 | Garrett et al. | |
| 6,915,380 B2 | 7/2005 | Tanaka et al. | |
| 6,917,992 B2 | 7/2005 | Grimsrud et al. | |
| 6,922,738 B2 | 7/2005 | Drescher et al. | |
| 6,928,509 B2 | 8/2005 | Surugucchi | |
| 6,961,813 B2 | 11/2005 | Grieff et al. | |
| 6,978,337 B1 | 12/2005 | Chang | |
| 7,009,827 B1 * | 3/2006 | Lee et al. | 361/91.1 |
| 7,039,737 B1 | 5/2006 | Dorr et al. | |
| 7,089,345 B1 | 8/2006 | Lynn | |
| 7,103,496 B2 | 9/2006 | Hong | |
| 7,111,158 B1 | 9/2006 | Burroughs et al. | |
| 7,171,525 B1 | 1/2007 | Norman et al. | |
| 7,200,698 B1 | 4/2007 | Rothberg | |
| 7,206,843 B1 | 4/2007 | Allavarpu et al. | |
| 7,225,290 B2 * | 5/2007 | Barth et al. | 710/316 |
| 7,246,192 B1 * | 7/2007 | Chang | 710/311 |
| 7,263,153 B2 | 8/2007 | Sutioso et al. | |
| 7,319,705 B1 | 1/2008 | Wu et al. | |
| 7,373,568 B1 | 5/2008 | Horovitz | |
| 8,677,047 B1 * | 3/2014 | Chang | 710/311 |
| 2002/0111929 A1 | 8/2002 | Pudipeddi et al. | |
| 2002/0144901 A1 | 10/2002 | Nulman et al. | |
| 2002/0159311 A1 | 10/2002 | Coffey et al. | |
| 2002/0173925 A1 | 11/2002 | Sugawara et al. | |
| 2002/0186706 A1 | 12/2002 | Chien et al. | |
| 2003/0005231 A1 | 1/2003 | Ooi et al. | |
| 2003/0035504 A1 | 2/2003 | Wong et al. | |
| 2003/0074515 A1 | 4/2003 | Resnick | |
| 2003/0081743 A1 | 5/2003 | Chiang et al. | |
| 2003/0088591 A1 | 5/2003 | Fish | |
| 2003/0131125 A1 | 7/2003 | Ooi | |
| 2003/0135577 A1 | 7/2003 | Weber et al. | |
| 2003/0145264 A1 | 7/2003 | Siegel et al. | |
| 2003/0167367 A1 | 9/2003 | Kaushik et al. | |
| 2003/0236952 A1 | 12/2003 | Grieff et al. | |
| 2004/0015637 A1 | 1/2004 | Yau | |
| 2004/0024950 A1 | 2/2004 | Surugucchi | |
| 2004/0044802 A1 | 3/2004 | Chiang et al. | |
| 2004/0068591 A1 | 4/2004 | Workman et al. | |
| 2004/0071251 A1 | 4/2004 | Sutioso et al. | |
| 2004/0081179 A1 | 4/2004 | Gregorcyk, Jr. | |
| 2004/0083323 A1 | 4/2004 | Rabinovitz et al. | |
| 2004/0083324 A1 | 4/2004 | Rabinovitz et al. | |
| 2004/0088441 A1 | 5/2004 | Chiang et al. | |
| 2004/0097124 A1 | 5/2004 | Garrett et al. | |
| 2004/0100944 A1 | 5/2004 | Richmond et al. | |
| 2004/0113662 A1 | 6/2004 | Grimsrud | |
| 2004/0117522 A1 | 6/2004 | Loffink et al. | |
| 2004/0120353 A1 | 6/2004 | Kim et al. | |
| 2004/0128627 A1 | 7/2004 | Zayas | |
| 2004/0151040 A1 | 8/2004 | Minami | |
| 2004/0193737 A1 | 9/2004 | Huffman et al. | |
| 2004/0198104 A1 | 10/2004 | Hadba et al. | |
| 2004/0199515 A1 | 10/2004 | Penny et al. | |
| 2004/0203295 A1 | 10/2004 | Hadba et al. | |
| 2004/0205288 A1 | 10/2004 | Ghaffari et al. | |
| 2004/0252672 A1 | 12/2004 | Nemazie | |
| 2004/0252716 A1 | 12/2004 | Nemazie | |
| 2004/0264284 A1 | 12/2004 | Priborsky et al. | |
| 2005/0005216 A1 | 1/2005 | Ghameshlu et al. | |
| 2005/0015655 A1 | 1/2005 | Clayton et al. | |
| 2005/0024083 A1 | 2/2005 | Kitamura et al. | |
| 2005/0027894 A1 | 2/2005 | Ayyavu et al. | |
| 2005/0055501 A1 | 3/2005 | Guha et al. | |
| 2005/0102468 A1 | 5/2005 | Delaney et al. | |
| 2005/0144490 A1 | 6/2005 | Igari | |
| 2005/0186832 A1 | 8/2005 | Nemazie | |
| 2005/0204078 A1 | 9/2005 | Steinmetz et al. | |
| 2005/0229249 A1 | 10/2005 | Piwonka et al. | |
| 2005/0242919 A1 | 11/2005 | Wang et al. | |
| 2005/0246475 A1 | 11/2005 | Ervin | |
| 2005/0251588 A1 | 11/2005 | Hoch et al. | |
| 2005/0289262 A1 | 12/2005 | Sutardja | |
| 2008/0310330 A1 | 12/2008 | Agazzi et al. | |

OTHER PUBLICATIONS

Mark Kyrnin, "Serial ATA", About.com.
Serial ATA Bridge Chip Solution 88i8030, Marvell, copyright May 2002.
Seagate, "Frequently Asked Questions", Seagate Technology LLC, http://www.seagate.com/products/interface/sata/faq.html.
"Group Announces Serial ATA Spec; bridge chips help you meet it," Greg Vrana, Nov. 8, 2001.

(56) References Cited

OTHER PUBLICATIONS

Authoritative Dictionary of IEEE Standard Terms, Seventh Edition; pp. 119, 123-124, and 378.
Taking a Ride on the Bus; Alan Benway; Apr. 2000; 5 pages.
SATA PHY interface Specification (SAPIS) Draft—Rev 0.90; Intel Corporation; Feb. 8, 2002; pp. 1-12.
RAID Anatomy 101; Alan Benway; Oct. 2000; 7 pages.
SATA Technology; www.sata-io.org; Dec. 15, 2004; 8 pages.
SATA v. PATA; Sanjeeb Nanda; Computer Technology Review;: Nov. 2002; p. 18.
Serial ATA: High Speed Serialized AT Attachment; Revision 1.0a; Jan. 7, 2003; APT Technologies, Inc., Dell Computer Corporation, Intel Corporation, Maxtor Corporation, Seagate Technology; 311 pages.
Serial ATA II: Port Multiplier, Revision 1.0, Mar. 25, 2003, APT Technologies, Inc., Dell Computer Corporation, Intel Corporation, Maxtor Corporation, Seagate Technology; 34 pages.
Serial ATA in Servers and Networked Storage; 2002; 12 pages.
Serial ATA II Workgroup; Serial ATA II Specification Port Selector, Proposed Draft; Revision 1.0RC, Jun. 23, 2003; 21 pages.
Information Technology—AT Attachment with Packet Interface—6 (ATA/ATAPI-6), Working Draft, T13 1410D, Revision 3; Peter T. McLean; Oct. 30, 2001; 496 pages.
Serial ATA: High Speed Serialized AT Attachment; Revision 1.0; Aug. 29, 2001; APT Technologies, Inc., Dell Computer Corporation, Intel Corporation, Maxtor Corporation, Seagate Technology; 307 pages.
Serial ATA II: Port Selector, Revision 1.0, Jul. 28, 2003; Dell Computer Corporation, Intel Corporation, Maxtor Corporation, Seagate Technology, Vitesse Semiconductor Corporation; 20 pages.
SATA (FAQs); Seagate Technology LLC; 2005; 3 pages.
Serial ATA II: Extensions to Serial ATA 1.0, REvision 1.0, Oct. 16, 2002; APT Technologies, Inc, Dell Computer Corporation, Intel Corporation, Maxtor Corporation, Seagate Technology; 84 pages.
U.S. Appl. No. 10/175,925, filed Sep. 2003, Shapira.
U.S. Appl. No. 10/666,959, filed Sep. 2003, Shapira.
U.S. Appl. No. 10/667,192, filed Sep. 2003, Shapira.
U.S. Appl. No. 10/667,196, filed Sep. 2003, Shapira.
U.S. Appl. No. 10/667,197, filed Sep. 2003, Shapira.
U.S. Appl. No. 10/795,727, filed Mar. 2004, Chang.
Andrew S. Tanenbaum; Structured Computer Organization; 1984; Prentice-Hall, Inc.; Second Edition; pp. 10 and 11.
Serial ATA in Servers and Networked Storage; Copyright 2002; APT Technologies, Inc., Dell Computer Corporation, Intel Corporation, Maxtor Corporation, Seagate Technology; pp. 7-10; http://www.serialata.org/whitepapers.asp.
Dictionary of Computers, Information Processing & Telecommunications, 2nd Edition, Jerry M. Rosenberg, 1987, pp. 8, 119 and 128.
Errata to "Serial ATA: High Speed Serialized AT Attachment," Serial ATA Organization, Revision 1.0, Errata dated May 24, 2002, 46 pages.
Ghaffari, et al.—U.S. Appl. No. 60/462,336, filed Apr. 14, 2003, pp. 1-11.
Serial ATA II Specification Connectivity Expansion through RSM; Apr. 30, 2002; Revision 0.6; 37 pages.
SIIG Inc., Serial AT A-to Ultra ATA adapter, SIIG, Inc.
Proposed Draft, Serial ATA II Workgroup, Revision I.0RC, Jun. 23, 2003, Serial ATA II Specification—Port Selection, 21 pages.
Spread Spectrum Scene; http://sss-mag.com/ss.html#tutorial; Mar. 27, 2007; pp. 1-6.

\* cited by examiner

METHOD AND APPARATUS FOR PROVIDING AN INTERFACE BETWEEN A HOST DEVICE AND A PLURALITY OF STORAGE DEVICES

CROSS-REFERENCE TO RELATED APPLICATIONS

The present disclosure is a continuation of U.S. patent application Ser. No. 11/879,108 (now U.S. Pat. No. 8,677,047), filed on Jul. 16, 2007, which is a continuation of U.S. patent application Ser. No. 10/339,897 (now U.S. Pat. No. 7,246,192), filed Jan. 10, 2003. The entire disclosures of the applications referenced above are incorporated herein by reference.

TECHNICAL FIELD

This invention relates to Serial Advanced Technology Attachment (SATA) input/output (I/O) assemblies.

BACKGROUND

The Parallel ATA (Advanced Technology Attachment) specification has defined the standard storage interface for PCs since the early 1980s. Parallel ATA provides low cost, broad operating system support, and steady evolution. Over time, parallel ATA has continuously evolved to support higher speed and performance. However, due to several reasons, including performance headroom, cabling issues, and voltage tolerance requirements, a new storage interface known as Serial ATA has recently been created.

Serial ATA may combine software transparency, low cost, scalability, and design flexibility to overcome the limitations of parallel ATA. Point-to-point data rates of 1.5 Gbps may be attainable with Serial ATA. Although SATA provides many benefits over PATA, there remains a large installed user-base of PATA compatible storage devices and computers. To continue to use the existing PATA compatible storage devices, bridge devices have been developed to interface PATA devices to SATA compatible computer systems.

FIG. 1 shows a conventional computer system 10 that communicates information via a SATA link 11. The computer system 10 includes a device bridge 12 to interface a PATA storage device 14 to a host controller 16 through a host bridge 18. The device bridge 12 and the host bridge 18 may each convert PATA formatted information to SATA formatted information and SATA formatted information to PATA formatted information. The device bridge 12 and the host bridge are generally not interchangeable due to differences in the header information that each of the bridges 12 and 18 generate when converting information between the SATA to PATA formats.

SUMMARY

In one aspect, an interface circuit for interfacing a Parallel ATA bus to a storage device. The interface circuit including a storage device controller in communication with the storage device to control a flow of information between the storage device and a Serial ATA bus. The Serial ATA bus to carry information having a Serial ATA format. A bridge circuit configured as a host bridge to interface between the Serial ATA bus and the Parallel ATA bus. The host bridge to convert Serial ATA information to Parallel ATA information and to convert Parallel ATA information to Serial ATA information.

The details of one or more embodiments of the invention are set forth in the accompa-nying drawings and the description below. Other features, objects, and advantages of the invention will be apparent from the description and drawings, and from the claims.

BRIEF DESCRIPTION OF DRAWINGS

Like reference symbols in the various drawings indicate like elements.

DESCRIPTION

Figure 1:
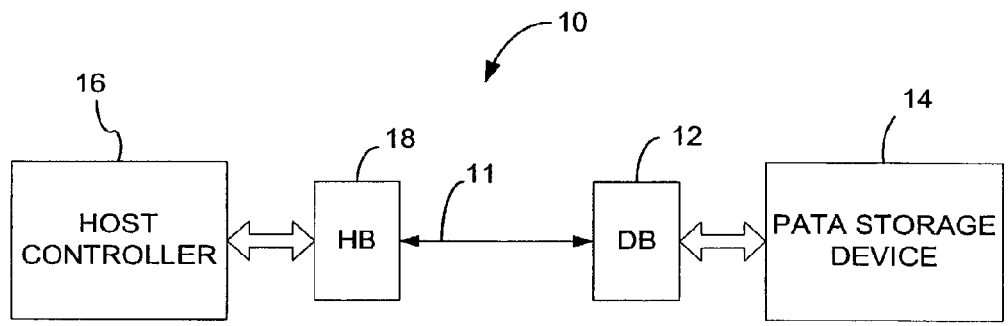
FIG. 1 is a block diagram of a conventional interface circuit.
Figure 2:
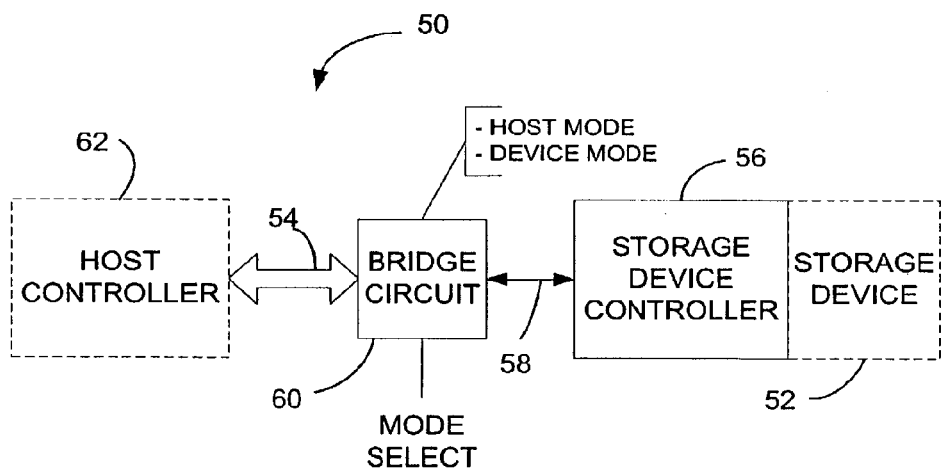
FIG. 2 is a block diagram of an aspect of an interface circuit.

FIG. 2 shows an aspect of an interface circuit 50 for controlling the communication of streams of information between a PATA compliant bus 54 and a SATA compliant bus 58. The interface circuit 50 may be implemented in any type of assembly such as on a single semiconductor die and as a multi-chip module. A Complementary Metal Oxide Semiconductor (CMOS) fabrication process is particularly suitable for fabricating the interface circuit 50, however any type of fabrication process may be used.

A hard disk controller 56 controls the flow of information between the SATA compliant bus 58 and a storage device 52. The storage device 52 may be any device for storing information such as a hard disk drive (HDD) and a CD-ROM. The hard disk controller 56 may be any type of controller that may interface to a SATA compliant bus. The SATA compliant bus 58 is suitable for carrying information that is formatted in accordance with the SATA standard.

A bridge circuit 60 is connected between the Serial ATA compliant bus 58 and the Parallel ATA compliant bus 54. The bridge circuit 60 may be selected to be in a host mode or a device mode in which the bridge circuit operates respectively as a host bridge or a device bridge. In this aspect, the bridge circuit 60 operates as a host bridge to enable the use of low-cost, widely available Parallel ATA connectivity while using a high-speed Serial ATA controller 56 to interface to the storage device 52. The bridge circuit 60 may receive Serial ATA commands communicated over the Serial ATA compliant bus 58. The bridge circuit 60 may decode the commands and convert them to Parallel ATA device commands. For responses from the Parallel ATA bus 54, the bridge circuit 60 may decipher, process, and convert the responses to Serial ATA protocol and communicate the responses over the Serial ATA compliant bus 58.

A mode select input 62 of the bridge circuit 60 may set the operating mode of the bridge circuit 60. Supported operating modes may include modes such as host mode and device mode. In host mode, the bridge circuit 60 operates as a host bridge. In device mode, the bridge circuit 60 operates as a device bridge. The mode select input 62 is preferably a single digital input and may advantageously be set at any time during the operation of the interface circuit 50. However, the mode select input 62 may also be implemented as one or more digital and analog inputs or be received via a Universal Asynchronous Receiver-Transmitter (UART).

Figure 3:
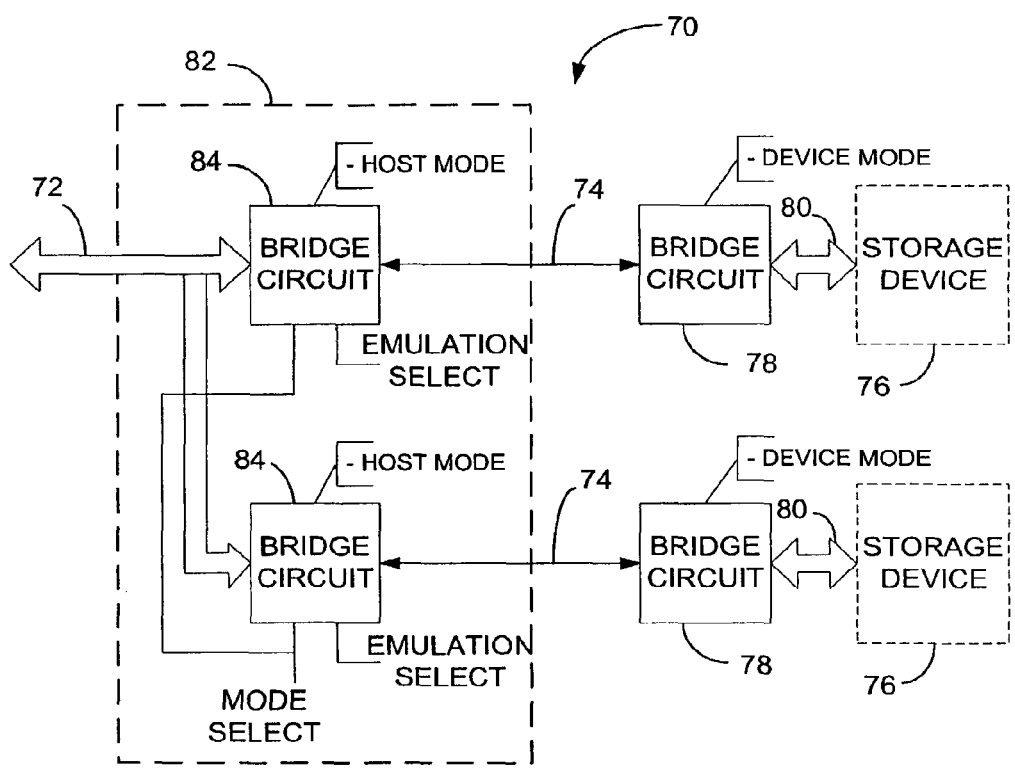
FIG. 3 is a block diagram of an emulation aspect of an interface circuit.

FIG. 3 shows an aspect of an interface circuit 70 for controlling the communication of streams of information between a PATA compliant bus 72 and two or more SATA compliant buses 74. The interface circuit 70 advantageously supports emulation of master/slave mode for attached storage devices 76 such as hard disk drives (HDDs) and CD-ROMs. The storage devices 76 may be PATA compliant or SATA compliant devices. For storage devices that are PATA compliant, bridge circuits 78 configured for device mode may interface between the SATA compliant buses 74 and PATA compliant buses 80 that connect to the storage devices 76. The bridge circuits 78 may include a mode select function that is set to device mode, or may be a single-mode bridge device.

An emulation circuit 82 may include two or more bridge circuits 84 to emulate master/slave mode for the storage devices 76. Each of the bridge circuits 84 connects between the PATA compliant bus 72 and corresponding ones of the SATA compliant buses 74. Each of the bridge circuits 84 may include a mode select input and an emulation select input.

The mode select input may receive a mode signal to set the bridge circuit 84 to either a host mode or a device mode. In this aspect, the bridge circuit 84 is preferably set to the host mode. When in host mode, the emulation select input may receive an emulation signal to set the bridge circuit 84 to an emulation state such as master, slave, and master/slave. The bridge circuit 84 emulates a storage device as a function of the emulation state indicated by the emulation signal.

Figure 4:
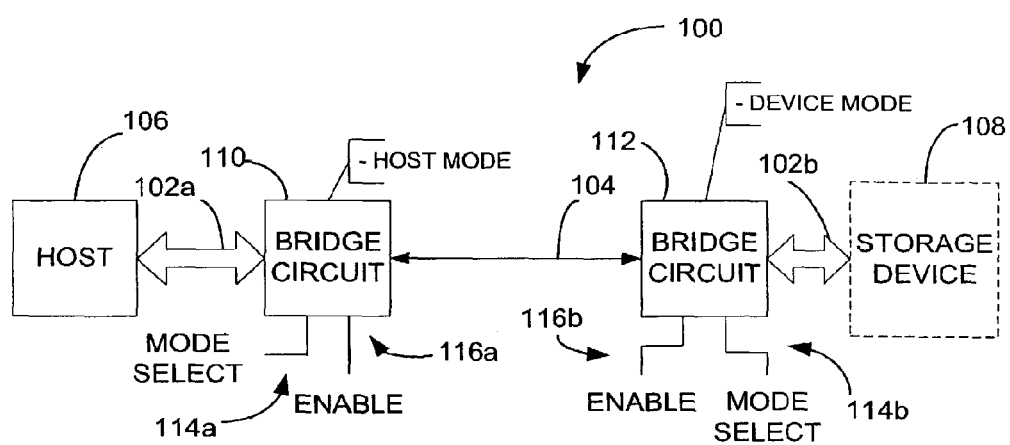
FIG. 4 is a block diagram of a hot plug aspect of an interface circuit.

FIG. 4 shows an aspect of an interface circuit 100 for controlling the communication of streams of information that flow between PATA compliant buses 102a and 102b and a SATA compliant bus 104. The interface circuit 100 is particularly suitable for a hot plugging operation between a host 106 and a storage device 108. Bridge circuits 110 and 112 correspond to the host 106 and the storage device 108. Each of the bridge circuits 110 and 112 may include a mode input 114 and a hot plug enable input 116. The mode input 114 may receive a mode signal to set the operating mode of the corresponding bridge circuit to a host mode or a device mode. The bridge circuits 110 and 112 are preferably configured in host mode and device mode respectively to correspond to the host 106 and the storage device 108.

The hot plug enable input 116 may receive a hot plug signal to enable or disable a hot plug mode. The bridge circuits 110 and 112 may also receive one or more of the hot plug signal and the mode signal via a communication device such as a UART. During hot plug mode, the bridge circuits may monitor the SATA compliant bus 104 to determine whether the SATA compliant bus has been disconnected or connected. For example, the bridge circuits may sense activity on the SATA compliant bus 104 to determine whether a hot plugging operation such as connecting or disconnecting has occurred.

In response to detecting a disconnecting operation, a signal may be sent to the operating system associated with the host 106 indicating that the storage device 108 has been disconnected. The bridges 110 and 112 may then monitor the SATA compliant bus 104 for activity such as an out of band (OOB) sequence. If activity is detected on the SATA compliant bus 104, the operating system may be notified and the bridges 110 and 112 may independently initiate operations to establish a communication link between the host 106 and the storage device 108 such as resetting the PHY associated with each bridge 110 and 112.

A number of embodiments of the invention have been described. Nevertheless, it will be understood that various modifications may be made without departing from the spirit and scope of the invention. For example, a UART may be included in a bridge circuit for communicating information. The UART may receive inputs such as mode select, master/slave emulation, and hot plug enable and communicate those inputs to other circuits in the bridge circuit. Accordingly, other embodiments are within the scope of the following claims.

What is claimed is:

1. An emulation circuit configured to emulate, at different times, each of a master mode and a slave mode to provide an interface between a host device and a plurality of storage devices, the emulation circuit comprising:
   a first bus configured to carry information that is formatted in accordance with a first standard;
   a second bus configured to carry information that is formatted in accordance with a second standard, wherein the second standard is different from the first standard; and
   a plurality of bridge circuits, each of the plurality of bridge circuits configured to
      communicate, over the first bus, the information that is formatted in accordance with the first standard to the host device,
      communicate, over the second bus, the information that is formatted in accordance with the second standard to a respective storage device of the plurality of storage devices,
      receive a mode select signal configured to set the bridge circuit to either a host mode or a device mode, wherein when in the host mode, the bridge circuit is configured to operate as a host with respect to the respective storage device of the plurality of storage devices, and wherein when in the device mode, the bridge circuit is configured to operate as a device with respect to the host device, and
   if the mode select signal sets the bridge circuit to the host mode, select, based on an emulation select signal that is independent of the mode select signal, between the master mode and the slave mode such that, while set to the host mode, the bridge circuit is further configurable between the master mode and the slave mode, wherein
      in the master mode, the bridge circuit is configured to emulate a storage device configured to operate in the master mode, and
      in the slave mode, the bridge circuit is configured to emulate a storage device configured to operate in the slave mode.

2. The emulation circuit of claim 1, wherein the bridge circuit is further configured to select a master/slave mode based on the emulation select signal, and wherein, in the master/slave mode, the bridge circuit is configured to emulate a storage device configured to operate in each of the master mode and the slave mode.

3. The emulation circuit of claim 1, wherein the first bus corresponds to a parallel advanced technology attachment bus and the second bus corresponds to a serial advanced technology attachment bus.

4. The emulation circuit of claim 1, wherein
   when in the host mode, the bridge circuit is configured to convert serial information received via the second bus to parallel information to be provided to the first bus, and
   when in the device mode, the bridge circuit is configured to convert parallel information received via the first bus to serial information to be provided to the second bus.

5. The emulation circuit of claim 1, wherein the bridge circuit includes a mode select pin configured to receive the mode select signal.

6. The emulation circuit of claim 1, wherein the mode select signal corresponds to a single digital input.

7. The emulation circuit of claim 1, wherein
the bridge circuit is configured to selectively operate in a hot plug mode in response to a hot plug signal, and
when the bridge circuit is operating in the hot plug mode, the bridge circuit is configured to determine whether the second bus has been connected to or disconnected from the bridge circuit.

8. A system comprising the emulation circuit of claim 1, and further comprising:
a second bridge circuit, external to the emulation circuit, connected between one of the plurality of bridge circuits and one of the plurality of storage devices.

9. A method of operating an emulation circuit including a plurality of bridge circuits, the emulation circuit configured to emulate, at different times, each of a master mode and a slave mode to provide an interface between a host device and a plurality of storage devices, the method comprising:
using each of the plurality of bridge circuits,
communicating, over a first bus, information that is formatted in accordance with a first standard to the host device,
communicating, over a second bus, information that is formatted in accordance with a second standard to a respective storage device of the plurality of storage devices, wherein the second standard is different from the first standard,
receiving a mode select signal configured to set the bridge circuit to either a host mode or a device mode,
when in the host mode, operating the bridge circuit as a host with respect to the respective storage device of the plurality of storage devices,
when in the device mode, operating the bridge circuit as a device with respect to the host device,
if the mode select signal sets the bridge circuit to the host mode, selecting, based on an emulation select signal that is independent of the mode select signal, between the master mode and the slave mode, such that, while set to the host mode, the bridge circuit is further configurable between the master mode and the slave mode,
in the master mode, emulating a storage device configured to operate in the master mode, and
in the slave mode, emulating a storage device configured to operate in the slave mode.

10. The method of claim 9, further comprising, using the bridge circuit:
selecting a master/slave mode based on the emulation select signal; and
in the master/slave mode, emulating a storage device configured to operate in each of the master mode and the slave mode.

11. The method of claim 9, wherein the first bus corresponds to a parallel advanced technology attachment bus and the second bus corresponds to a serial advanced technology attachment bus.

12. The method of claim 9, further comprising, using the bridge circuit:
when in the host mode, converting serial information received via the second bus to parallel information to be provided to the first bus, and
when in the device mode, converting parallel information received via the first bus to serial information to be provided to the second bus.

13. The method of claim 9, further comprising receiving the mode select signal at a mode select pin of the bridge circuit.

14. The method of claim 9, wherein the mode select signal corresponds to a single digital input.

15. The method of claim 9, further comprising, using the bridge circuit:
selectively operating in a hot plug mode in response to a hot plug signal; and
when in the hot plug mode, determining whether the second bus has been connected to or disconnected from the bridge circuit.

16. The method of claim 9, and further comprising:
connecting a second bridge circuit, external to the emulation circuit, between one of the plurality of bridge circuits and one of the plurality of storage devices.

* * * * *